United States Patent
Brown et al.

3,644,047
Feb. 22, 1972

[54] APPARATUS AND METHOD OF SIMULTANEOUSLY INSPECTING A PLURALITY OF SURFACES OF A BODY BY HOLOGRAPHIC INTERFEROMETRY

[72] Inventors: Gordon M. Brown, Ann Arbor; Kenneth R. Porter, Pinckney, both of Mich.

[73] Assignee: GC Optronics Inc., Ann Arbor, Mich.

[22] Filed: May 8, 1956

[21] Appl. No.: 823,100

[52] U.S. Cl..............................................356/109, 350/3.5
[51] Int. Cl. ........................................................G01b 9/02
[58] Field of Search..............73/67.5 H, 68 O; 356/109, 237; 350/3.5

[56] References Cited

OTHER PUBLICATIONS

Pennington, K. S., " How to Make Laser Holograms," Microwaves, Oct. 1965, pp. 35–40.
Leith et al., " Investigation of Hologram Techniques," Willow Run Laboratories, The University of Michigan, Dec. 1965, pp. 5–12.
Brooks et al., " 9A9 Pulsed Laser Holograms," IEEE Journal of Quantum Electronics Vol. QE-2 No. 8 Aug. 1966 pp. 275–279.
" Greater Depth of Field With Holograms" Bell Laboratories Record, Vol. 45, No. 7., July/Aug. 1967 pp. 238–239.

*Primary Examiner*—Ronald L. Wibert
*Assistant Examiner*—Orville B. Chew, II
*Attorney*—Hauke, Krass, Gifford & Patalidis

[57] ABSTRACT

To detect imperfections on at least two nonparallel surfaces of a pneumatic tire simultaneously the tire is inflated on a rotatably supported wheel and a hologram is formed of surfaces to be studied by photographically recording the interference pattern between an object beam originating from a laser and reflected from the tire and a composite reference beam derived from the laser. The object beam is formed by illuminating the tread surface of the tire directly and illuminating the sidewalls if the tire by means of mirrors which also direct the reflected light to a photographic plate. The composite reference beam is formed by passing the laser light through an interferometer which divides the light into two components and recombines them after they have gone through different path lengths. Since the components have traveled through different distances to arrive at the plate different components of the beam will be coherent with the reflections from the various nonparallel surfaces of the tire thereby allowing the photographic plate to record interference patterns with reflections emanating from the surfaces. With the use of either the real time or double exposure technique any variations in the surface contour of the nonparallel surfaces of the tire will be revealed in the form of anomalies in fringe lines or shaded areas which appear on the hologram because of the interference of the two optical wave systems and may be viewed by appropriately illuminating the hologram with the reference beam.

12 Claims, 4 Drawing Figures

INVENTORS
GORDON M. BROWN
KENNETH R. PORTER
BY *Hauke, Krass, Gifford, & Patalidis*
ATTORNEYS

APPARATUS AND METHOD OF SIMULTANEOUSLY INSPECTING A PLURALITY OF SURFACES OF A BODY BY HOLOGRAPHIC INTERFEROMETRY

BACKGROUND OF THE INVENTION

I. Field Of The Invention

This invention relates to a method and apparatus for simultaneously inspecting a plurality of surfaces on a pneumatic tire structure by effectively detecting variations in the expansion of the tire over a period of time employing techniques of holographic interferometry as a tool of analysis. More particularly, this invention refers to apparatus and method which allows formations of holograms over object depth of fields which exceed the coherence length of a laser.

II. Description Of The Prior Art

Techniques for reconstructing complex optical wave fronts by photographically recording the interference pattern between coherent light and the wave front reflected from an object illuminated by the coherent light have made great advances in the past few years under the impetus of the development of the laser as a source of relatively intense and highly coherent light. A number of forms of such photographic records or holograms have been developed. The commonest variety is formed by the exposure of one side of a photographic plate to both coherent light derived from a laser and to the light reflected from an object to be studied which is illuminated by the coherent light. The film effectively records interference pattern between the two sources and on development bears resemblance to a defraction grating. When it is illuminated by coherent or monochromatic light it defracts the light into a pattern which duplicates the original reflected wave front. Accordingly, an image of the original object may be seen through the illuminated hologram which bears all the optical properties of the original object.

Holographic interferometry employs holograms to detect variations in an object's contour or position between two states by comparing the object's original contour and position as recorded in the hologram with a later contour and position. This may be achieved by any one of several techniques, such as the real time technique or the double exposure method. The problem with these techniques is that they may not be utilized to view a plurality of surfaces which are in a nonparallel relationship and which are not all incident to the photographic plate upon which the hologram is to be made.

The light produced by presently available lasers has a coherence which greatly exceeds that of light produced by other available sources, but the laser output is still far from perfectly coherent. The term coherence includes several measures of the uniformity or stability of a light beam, but considering only that aspect of the term which applies to the phase uniformity of a light produced by a source over a period of time, the laser beam really has quite a limited temporal or longitudinal coherence. This measure expresses a degree to which the electromagnetic waves produced by the laser source at separate times are in phase with one another. The coherence length of the laser refers to the maximum distance along the laser beam which the waves are within a predetermined limited phase relationship with respect to one another. When laser light is used to form a hologram this coherence length may be taken as a rough measure of the maximum depth of field which could be achieved in the hologram since light reflected from two points separated from one another by a distance greater than the coherence length will not coherently interfere with a single reference beam derived from the same source. Thus, as a practical matter the formation of holograms over an object's depth of fields cannot exceed the coherence length of the laser as applied under known techniques.

SUMMARY OF THE INVENTION

The present invention contemplates a method and apparatus wherein a hologram may be formed of a pneumatic tire including the tread and opposite sides of the tire simultaneously wherein the dimensions of the tire exceed the coherence length of the laser from which an optical image of the tire may be constructed by employing a coherent light source and to an apparatus for practicing the method. Broadly speaking the present invention consists of forming an object beam which consists of two sections having gone through different path lengths. The object beam is formed by projecting one of the sections of a light from a laser directly onto the tire to be analyzed and reflecting the same from the tire onto a photographic plate while simultaneously projecting a second section of the light from a laser onto the opposite side surfaces of the tire by means of a mirror arrangement; the light illuminating the sides of the tires is thereby reflected upon the photographic plate by means of the mirrors. Simultaneously with the projection of the object beam on the photographic plate a composite reference beam derived from the laser is formed by effectively passing a single beam of laser light through an interferometer-type apparatus which divides the beam into two segments and recombines them after they have passed through different path lengths. This composite beam is then projected on the photographic plate through an appropriate lens-pinhole system. The hologram which results after development of the photographic plate may be illuminated to reconstruct an image of the tire, wherein the reconstructed image will simultaneously show the tread and opposite sides of the tire.

The present method makes use of the fact that after a pneumatic tire is inflated the stress thus imposed on the tire body results in a dimensional change in areas of weakness over a period of time. This creep of the tire is a function of the pressure of inflation and the strength of the body. Inflation to a normal pressure will produce almost no creep in a uniform tire body of normal strength, however any areas which are weakened with respect to the normal body will respond to the stresses initiated by the inflation and subsisting over a period of time and by stretching at a higher rate in the surrounding areas of the tire. Immediately after the application of normal inflation forces almost every defect in a tire, including internal defects which are only otherwise detectable under dissection of the body, will result in nonuniformalities of the creep rate resulting in contour irregularities which are undetectable by the eye but which may be detectable by holographic interferometry.

One embodiment of our invention involves technique of forming a hologram of an initial section consisting of the tread and the opposite sides of the tire adjacent to said tread and then superimposing the virtual image of the section as seen through the developed hologram on the same section. This technique allows the study of the creep effect over a continuous interval of time. Another technique is that of a double exposure method in which two exposures of an identical tire section are made at two separate times with the geometry of the exposure arrangement being identically preserved between the times. The double exposure technique is advantageous when particular defects are being searched for a previous determination has been made as to the pressure and tires required to make these defects visible to a holographic process.

Still a third interferometric technique has been developed. It involves the taking of a single exposure of the tire section over a period of time typically from 10 seconds to 1 minute. The photographic media records the integral of the light received over the exposure period. Any creep occurring during this time will result in fringe patterns and shaded areas appearing on the reconstructed virtual image. In areas of movement of relatively few wavelengths, observable fringe lines are obtained.

The method of the present invention allows the testing of tires on a production basis. The entire tire can be analyzed by rotatably mounting the tire and rotating the same over any desired increment and photographing a small section of the tread and its associated side surfaces during each separate increment. As an alternate the entire face of the tread and the entire sides of the tire through a suitable mirror arrangement may be photographed and analyzed.

It can therefore be seen that a primary object of the present invention is to provide a method of detecting tire irregularities which involves inflation of the tire and a comparison of the contour of the tire including its tread and the opposite nonparallel surfaces adjacent thereto at separate times after inflation by the method of holographic interferometry.

Other objects, advantages and applications of the present invention will be made apparent by the following detailed description of a preferred embodiment of the invention. The description makes reference to the accompanying drawings in which.

Figure 3:
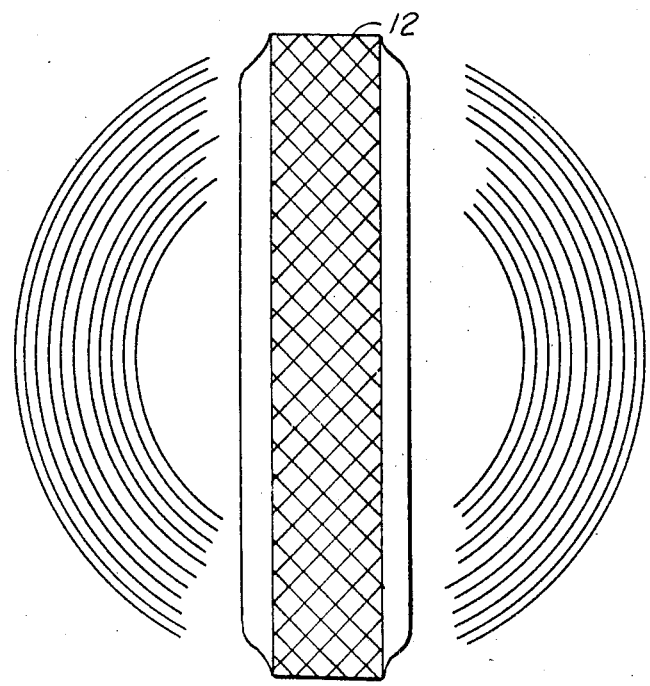
Figure 4:
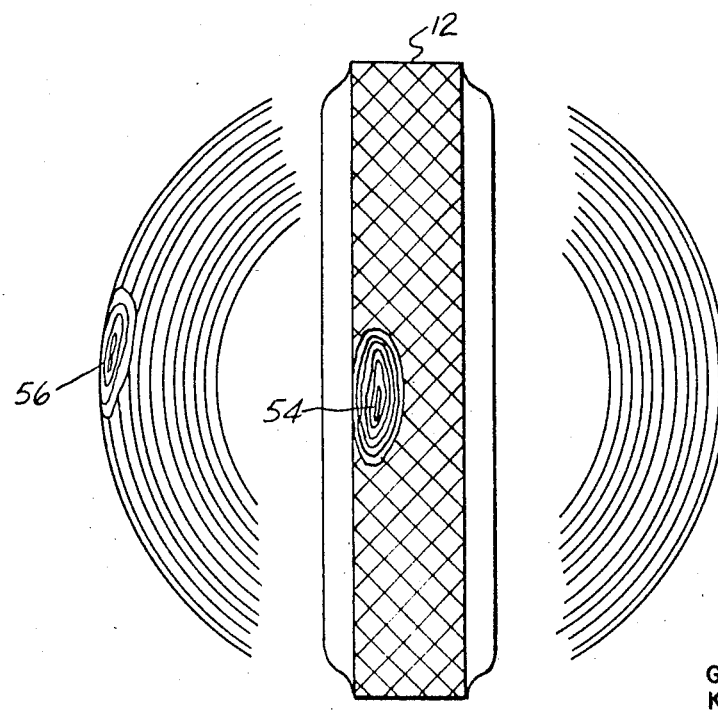

FIG. 3 is a view of a section of the tire tread and the adjacent sides associated therewith as seen through a hologram formed in accordance with any of the embodiments of the present invention; and FIG. 4 is a view of a section of the tire tread and the adjacent sides associated therewith containing defects as seen through a hologram formed in accordance with any of the embodiments of the invention.

Figure 1:
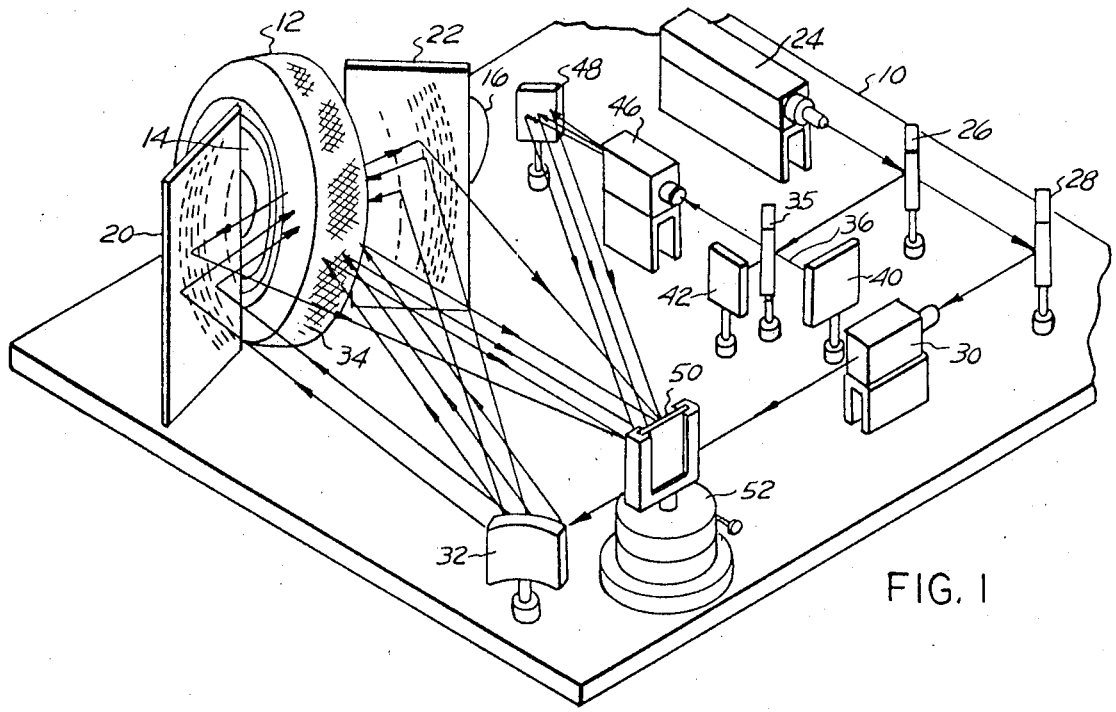
FIG. 1 is a perspective view of the significant portions of the apparatus for practicing the preferred methods of the present invention.
Figure 2:
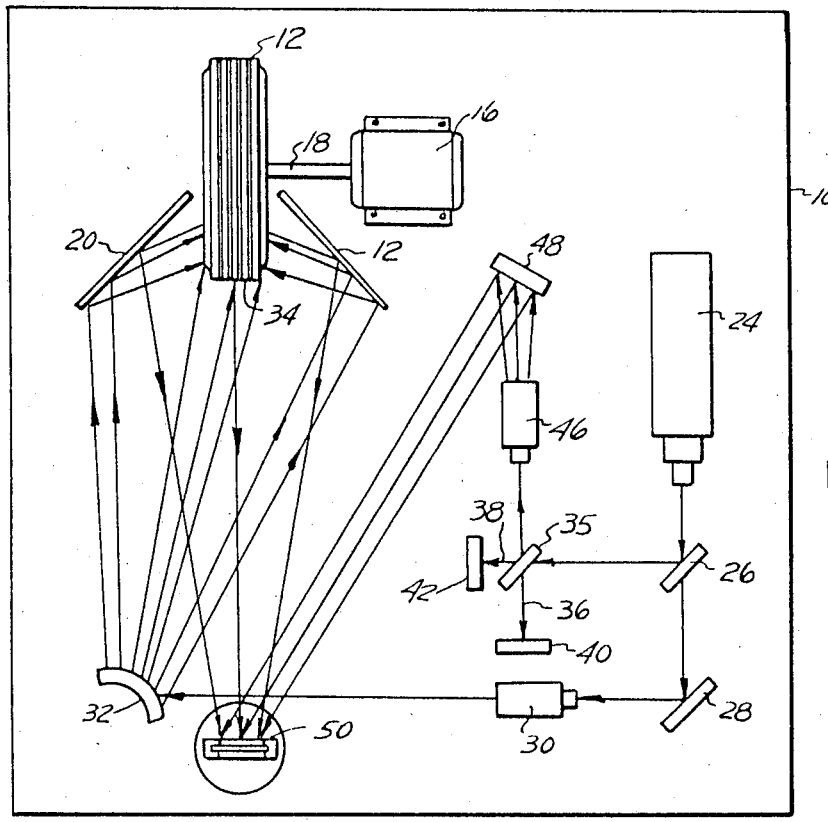
FIG. 2 is a schematic view illustrating the geometrical relationships of the apparatus for practicing the present invention in accordance with the apparatus of FIG. 1.

The apparatus for practicing any of the embodiments of the present invention such as double exposure analysis, real time analysis or time-integrated exposure analysis may take substantially the same form. A representative arrangement for detecting flaws in a section of tire tread and the sides of the tire associated with that section by any of these techniques of interferometric holographics is illustrated in FIGS. 1 and 2. In the arrangement of FIGS. 1 and 2 the holographic apparatus is supported on a granite table 10 which may be provided with air cushion supports (not shown) to give it a high degree of stability. A tubeless pneumatic tire 12 to be examined is affixed to a wheel 14 which is rotatably mounted to a motor 16 by means of a drive shaft 18. The motor 16 is affixed to the table so that the wheel axis is in a horizontal direction. A pair of mirrors 20 and 22 are disposed on opposite sides of the tire in such a manner that when viewing a tread section of the tire, the mirror arrangement allows a simultaneous viewing of tire sections lying in nonparallel planes relative to the front tread section. The use of the mirror arrangement permits a simultaneous analysis of the tread and a tire sidewall or a thread and both sidewalls or even the whole tire.

Coherent light for the practice of the holographic methods is derived from a laser 24 which may be of a continuous wave type. Its light output is projected to a beam splitter 26. One beam from the splitter passes therethrough and is reflected by means of a mirror 28 so as to pass through a special filter assembly 30 which consists of a pinhole and a lens which projects the beam onto a mirror 32 of a concave shape. The mirror projects an area of the coherent light onto a section of the tire tread 34 and simultaneously by means of the mirror arrangements 20 and 22 the coherent light is projected onto the opposite sides of the tire adjacent and associated with the tire tread section 34.

The laser 24 has a coherence length of approximately 6 inches. That is to say that relatively high-quality interference lines may be observed in an interferometer by comparing two sections of the beam which have traveled through path lengths which do not differ from one another by more than 6 inches.

The beam section reflected at a 90° angle through the half silvered mirror 26 is projected on another half silver mirror 35 to divide out a right-angle beam section 36 and to allow a second beam section 38 to continue in the path of the original beam. The beam sections 36 and 38 are respectively reflected back to the half silver mirror 35 by normally disposed mirrors 40 and 42. The mirror 40 is separated from the beam splitter 35 by approximately 3 inches more than the mirror 42. Thus, the beam 36 has traveled through a path length which is 6 inches greater than the path length of the beam 38 by the time they arrive back at the half silvered mirror 35. The output of the beam splitter 35 is a composite beam having a pair of components with path lengths which differ from one another by approximately 6 inches or the coherence length of a laser 24. This composite reference beam is passed through a second special filter 46 and is then reflected to a photographic plate 50 from a mirror 48 so that all components have the same wave front curvature. The plateholder 50 also receives reflected light from the area 34 of the tire tread and by means of the mirror arrangement 20 and 22 light reflected from the opposite nonparallel sides of the tire is received by the plateholder 50.

The beam of light projected onto the plateholder 50 by means of the mirror 48 will be referred to as the reference beam, while the light reflected to the plateholder 50 by the illuminated section of the tire tread 24 and the opposite nonparallel sides associated therewith will be termed the object beam.

The plateholder 50 is supported on a base generally indicated at 52 which is adapted to adjust the position of the plateholder with respect to the other apparatus. This may be done by rotating the plateholder or adjusting it along either of a pair of mutually perpendicular lines in the horizontal plane. The plateholder 50 may be of any suitable variety.

The two light systems interfere with one another causing an optical pattern to be recorded on the photographic plate 50.

The light which is reflected to the photographic plate from the tire tread nearest to the plate has traveled through a substantially shorter path from the laser than that light which is reflected from the opposite nonparallel surfaces of the tire by means of the mirror arrangements 20 and 22. Light reflected from the near end, that is from the tread section 34, will be most coherent with the components of the reference beam having the shorter path length, while light reflected from the furthest distance, that is from the opposite sides of the tire by means of the mirror arrangements 20 and 22, will be most coherent with the component of the beam having the longer path length.

If only a single component reference beam was employed, as is done in normal holographic procedure, only a portion of the light reflected from the tire would coherently interfere with the reference beam. Employing the technique of the present invention coherence may be obtained over a substantially greater section of the tire, specifically it can be obtained over the tread and the opposite nonparallel side surfaces associated therewith.

In the practice of any of the three holographic interferometric techniques a photographic plate is first placed in the plateholder 50, the laser is turned on and an exposure is made in the manner hereinbefore described. In the real time or double exposure methods, this initial exposure is of a length that is dependent upon the speed of the photographic emulsion and the illumination level and is sufficient to provide adequate recordation of the interference patterns between the reference and object beams without significant object motion. In the time-integrating exposure technique object motions during the exposure time are made significant.

Following the initial exposure in a real time analysis the plate is suitably developed and fixed either in situ if the plateholder is so equipped or by removing it and processing and later reinserting the developed hologram in the plateholder. The laser may then be reinitiated and the virtual image recorded by the initial exposure may be seen by viewing through the hologram in a direction of the tire. It may be necessary to adjust the relative intensities of the reference and object beams during the viewing process with respect to their intensities during the exposure process. In order to obtain coincidence between the reconstructed virtual image of a tire as seen through the hologram and the tire section itself it may be necessary to adjust the position of the plateholder. When the virtual image and the actual image of the tire are in substantially exact superposition any variation in the contour of the tire section since the initial exposure will be made apparent.

FIG. 3 illustrates the tire section as viewed through the hologram with exact superposition where no appreciable creep of the tire has occurred. The tire tread section and the adjacent nonparallel side surfaces as viewed through the mirror appear substantially normal and no fringe lines are visible on the illuminated section.

FIG. 4 illustrates the same tire tread section and the associated nonparallel side surfaces wherein a debonding between the ply and the tread rubber has occurred and a shoulder separation between the liner and the first ply is illustrated respectively on the face of the tread at 54 and on the sidewalls of the tire at 56. Although this disbonding is below the surface of the tire the force exerted on the tire by the inflation pressure causes an outward bulging through a very slight distance. However, this bulging results in an interference between the wave front generated by the virtual image and the actual tire section so as to set up the oblong fringe lines 54 and 56 which are visible on the coincident images as viewed through the hologram.

In the double exposure technique the photographic plate is not removed from the plateholder 50 after initial exposure or developed, rather a second exposure is made after a short period of time, such as 30 seconds without disturbing the geometry of the situation. After the second exposure the photographic plate is removed and developed. The resultant hologram is utilized by illuminating one side with coherent light at approximately the same angle as that at which the reference beam impinged during the exposure process in viewing through the other side of the hologram. In reconstruction of the tire image any appreciable motion of points on a tire tread section or on the opposite side surfaces of a tire as viewed through the mirror arrangement which occurred between the two exposure times will result in a fringe system on the order of that shown in FIG. 4.

In the practice of the tire-intergraining exposure technique only a single exposure is made, but this exposure is of a prolonged variation and acts to detect creep of the tire joining the exposure. The reconstruction of the time exposure hologram substantially resembles the reconstruction obtained by the other techniques.

In the practice of the present invention the tire is preferably inflated to a normal operating pressure. However, higher pressures may be used although the exposure times or the times between the exposure may have to be minimized because of higher pressure produces an overall creep of the tire. We have also determined that the rate of creep may be locally increased by heat of the tire during or between exposures as by infrared lamp. The increased speed of creep when the tire is subjected to the heating may be the result of an increased pressure generated by the heating of the air, but is also believed to be connected to the heating effect on the rubber itself.

Having thus described our invention, we claim:

1. A method of analyzing the deformation of an object having a plurality of surfaces in nonparallel relationship comprising: at a first time simultaneously exposing a photographic media to an object wave comprising coherent light having a plurality of components one of which is reflected directly from at least one of said nonparallel surfaces of said object illuminated by a coherent light source and the other of which is reflected via a reflecting means from at least one other of said nonparallel surfaces of said object illuminated by said coherent light source via said reflecting means and to a reference wave from said coherent light source, said reference wave having a plurality of components each of which has traveled through a different path length from the coherent light source to the photographic media, the path lengths differing by less than the coherence length of the light source and each of which has the same radius of curvature at the photographic media; developing the photographic media so as to form a hologram of said nonparallel surface; at a later time superimposing the virtual image of said nonparallel surfaces as seen through the resultant hologram when the hologram is properly illuminated with a second image of said nonparallel surfaces as they appear at a different time and observing and analyzing the fringe lines which appear on the reconstructed image of the nonparallel surfaces.

2. A method of analyzing the deformation of an object as described in claim 1, wherein the second image of nonparallel surfaces is created in real time by said nonparallel surfaces.

3. The method of analyzing the deformation of an object as described in claim 1, wherein said second image of the nonparallel surfaces occurs as a result of a second exposure of the photographic media simultaneously to a reference wave of coherent light and to a wave beam consisting of coherent light reflected from said nonparallel surfaces of the object at a different value of the control variable and at a time later than the initial exposure of the photographic media and before the developing of the photographic media so that the two holograms are recorded on the same photographic media.

4. The method of analyzing the deformation of an object as described in claim 1, wherein the second image of said same nonparallel surfaces occurs as the result of the photographic media being exposed to said reference wave and said object wave for a sufficient period of time for movement of any defective part of said object contained in said surfaces through a sufficient distance to record a continuous interference pattern on said media.

5. The method of detecting defects in a pneumatic tire comprising: inflating the tire; at a first time simultaneously exposing a photographic media to an object wave consisting of coherent light having a plurality of components one of which is reflected directly from at least one surface on said tire illuminated by a coherent light source, and the other of which is reflected via a reflecting means from at least one other nonparallel surface on said tire illuminated by said coherent light source via said reflecting means and to a reference wave from said coherent light source, said reference wave having a plurality of components each of which has traveled through a different path length from the coherent light source to the photographic media, the path lengths differing by less than the coherence length of the light source; developing the photographic media so as to form a hologram; coherently interfering the virtual image of said surfaces as seen through the resultant hologram when the hologram is properly illuminated with a second image of the same surfaces of the tire occurring at a different time so that any creep in the tire surfaces between the time of initially exposing the photographic media and the time at which the second image of the tire surfaces occurred are revealed as fringe lines arrayed in a pattern which is a function of the motion of the areas on the tire surfaces between such times such motion being related to defects in the tire surfaces.

6. The method of claim 5, wherein the second image of the surfaces of the tire is created in real time by said tire surfaces.

7. The method of claim 5, wherein said second image of the same surfaces of the tire occurs as a result of a second exposure of the photographic media simultaneously to a reference wave of coherent light and to an object wave consisting of coherent light reflected from said surfaces of the tire at a time later than initial exposure of the photographic media and before the development of the photographic media so that two holograms are recorded on the same photographic media.

8. The method of claim 5, wherein the second image of the same section of the tire occurs as a result of the photographic media being exposed to said reference wave and said object wave for a sufficient period of time for movement of any defective part of the tire contained in said section through a sufficient distance to record a continuous interference pattern on said media.

9. A method of analyzing the deformation of an object having a plurality of surfaces in nonparallel relationship, comprising: simultaneously exposing the photographic media to an object wave of coherent light having a plurality of components, one of which is reflected directly from at least one of said nonparallel surfaces of the object as it is illuminated by a coherent light source and the other of which is reflected via a reflecting means from at least one other of said nonparallel surfaces of said object which is illuminated by said coherent light source via said reflecting means, and to a reference beam from said coherent light source having a coherence length sufficient to coherently interfere with each of said object wave components developing the photographic media so as to form a hologram of said nonparallel surfaces; coherently superimposing the virtual image of said nonparallel surfaces as seen through the resulting hologram when it is properly illuminated with a second image of said nonparallel surfaces as it appears at a different time; and observing and analyzing the fringe lines which appear on the reconstructed image of the nonparallel surfaces.

10. A method of analyzing the deformation of an object as described in claim 9, wherein the second image of nonparallel surfaces is created in real time by said nonparallel surfaces.

11. The method of analyzing the deformation of an object as described in claim 9, wherein said second image of the nonparallel surfaces occurs as a result of a second exposure of the photographic media simultaneously to a reference wave of coherent light and to a wave consisting of coherent light reflected from said nonparallel surfaces of the object at a time later than the initial exposure of the photographic media and before the developing of the photographic media so that the two holograms are recorded on the same photographic media.

12. The method of analyzing the deformation of an object as described in claim 9, wherein the second image of said same nonparallel surfaces occurs as the result of the photographic media being exposed to said reference beam and said object beam for a sufficient period of time for movement of any defective part of said object contained in said surfaces through a sufficient distance to record a continuous interference pattern on said media.

* * * * *